(No Model.)
C. F. SMITH.
FAUCET.
No. 387,014. Patented July 31, 1888.
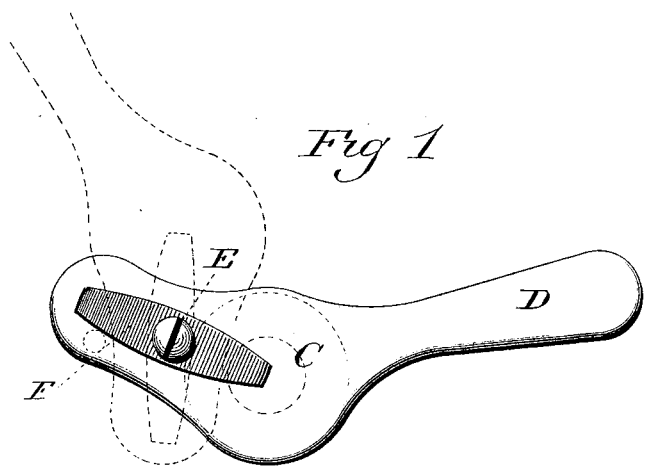
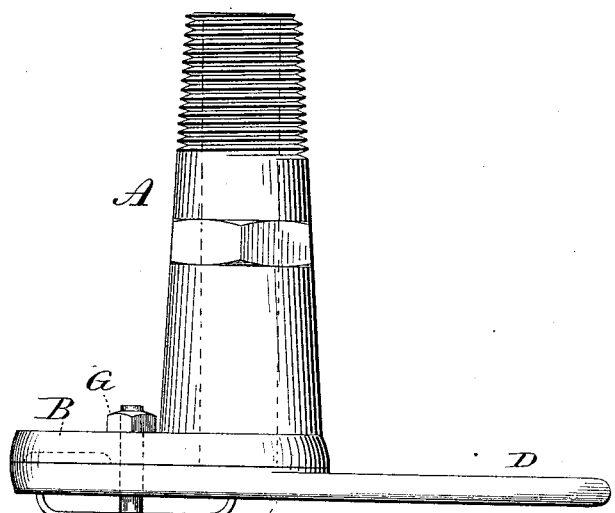
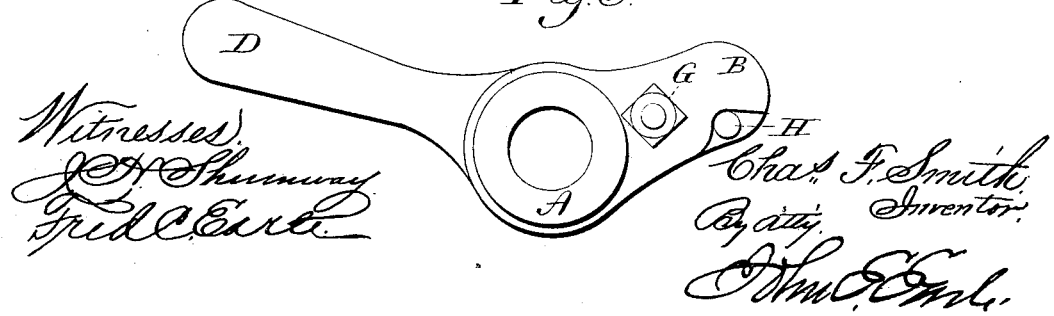
Witnesses
J. H. Shumway
Fred C. Earl
Chas. F. Smith
Inventor
By atty
Wm C. Earl

UNITED STATES PATENT OFFICE.

CHARLES F. SMITH, OF NEW BRITAIN, CONNECTICUT.

FAUCET.

SPECIFICATION forming part of Letters Patent No. 387,014, dated July 31, 1888.

Application filed September 12, 1887. Serial No. 249,433. (No model.)

*To all whom it may concern:*

Be it known that I, CHARLES F. SMITH, of New Britain, in the county of Hartford and State of Connecticut, have invented a new Improvement in Faucets; and I do hereby declare the following, when taken in connection with accompanying drawings and the letters of reference marked thereon, to be a full, clear, and exact description of the same, and which said drawings constitute part of this specification, and represent, in—

Figure 1, a front view of the faucet, the gate in the closed position in broken lines open; Fig. 2, a top view of the same; Fig. 3, a rear view showing the lever-stop.

This invention relates to an improvement in that class of faucets commonly called "open end" faucets—that is to say, a faucet which consists of a tube having an open end with a gate hung so as to swing in a plane across the open end of the faucet-tube.

In the more general construction of this class of faucets a lever is hung upon a pivot at one side of the open end of the tube, the lever extending across the open end, terminating in a handle upon the opposite side, by which the lever or gate may be turned upon its pivot, so as to open or close the faucet. The gate under the more general construction is made separate from the lever, but attached thereto so as to swing across the open end of the faucet-tube, and is made adjustable by a screw through the lever, arranged to bear upon the gate, so as to force it into closing contact with a packing on the open end of the faucet-tube.

In adjusting the gate so as to increase the pressure upon the gate, the tendency is to turn the lever outward, or away from the gate, because the lever is the only resistance which exists for such force. The result of this is that in applying such pressure the lever is cramped upon its pivot to a greater or less extent and so as to prevent the free opening and closing of the gate. Again, in this usual construction the gate is necessarily made separate from the lever in order to maintain its position flat against the open end of the tube— that is, it being separate from the lever, it is enabled to adapt itself to the surface irrespective of the position of the lever with relation thereto; but another difficulty arises from this construction, owing to the fact of the necessity of a packing between the gate and the end of the faucet. Again, very little force from the inside outward will prevent the gate properly closing the open end of the faucet. Many times even very thick molasses will deflect the gate to such an extent as to prevent tight closing, and should any obstruction or foreign substance be in the liquid running through the faucet at the time of closing the gate it will cause the gate to be deflected so far as to permit such foreign substance to pass in between the end of the faucet and the gate, and thus leave the faucet improperly closed.

The object of my invention is to not only avoid the cramping or twisting strain upon the pivot and make the gate an integral part of the lever, but to insure the gate working in close contact with the face of the end of the faucet-tube, and so that the gate itself serves to clean its seat without liability of being deflected, as before mentioned.

A represents the body or tube of the faucet, which is of the usual form, terminating at the inner end in a screw for convenience of attachment. From one side of its outer end is a radial projection, B. The outer surface of this projection and the open end of the tube are in the same plane and should be smooth. The gate-lever C corresponds in shape substantially to the outer end of the tube and the projection B, and is constructed with a projecting arm, D, upon the side opposite the projection B for a handle. The inner face of the gate-lever is made flat and smooth, corresponding to the adjacent surface of the end of the faucet-tube and the projection B, and so that they may set in close contact, as seen in Fig. 3.

The pivot for the gate-lever is best made in the form of a screw introduced through the lever and threaded into the projection B at a point midway between the end of the projection B and the faucet-tube, and so as to leave a surface-bearing between the gate-lever and the end of the tube, and also a surface-bearing between the projection B and that end of the lever.

Upon the outside of the lever a clamp, F, is arranged, through which the pivot extends, and so that the end of the pivot will bear upon the said clamp. The clamp extends to the right and left, one end taking a bearing upon the outer surface of the lever substantially central with the tube—that is, on what may be called the "gate part" of the lever. The other end extends in the opposite direction and so as to bear that end of the lever against the projection B. This clamp is preferably made elastic and so as to bear with spring-pressure upon the gate lever, and because the clamp is made to bear upon the lever at points upon opposite sides and distant from the pivot it holds the gate-lever in close bearing contact with the face of the faucet upon both sides of the pivot; hence the twisting strain before referred to as upon the pivot in the usual constructions is avoided, and because of making the gate as an integral part of the lever and with the peculiar bearing which I have described the usual packing is avoided, and the gate itself, working in close contact with the end of the tube without the packing, necessarily comes close to the face of the end of the tube in the act of closing and so as to cut off whatever may be passing through the tube and without liability of deflection, as in the case of the more general construction of this class of faucets.

I apply a jam-nut to the pivot to prevent its accidental disadjustment. I also provide the lever with a stud, H, to strike the projection B, as seen in Fig. 3, as a stop when the gate reaches its closed position.

The pressure of the gate upon the end of the faucet may be increased or diminished by adjusting the pivot through the clamp, causing the clamp to bear with correspondingly greater or less force upon the lever.

The bearing between the lever and the projection B need not be throughout the entire extent of the adjacent surface, as the surface may be recessed, as indicated in broken lines, Fig. 2, it only being essential that the lever and projections shall extend beyond the pivot, so as to take a working bearing on that side of the pivot corresponding to the bearing on the gate side, and thereby equalizing the strain upon the pivot.

From the foregoing it will be understood that I do not claim, broadly, a faucet consisting of a tube having an open end with a lever pivoted thereto so as to work transversely across said open end and serve both as a handle and gate, with a spring the tendency of which is to force the inner face of the lever yieldingly against the face of the faucet-tube.

I claim—

The herein-described faucet, consisting of a tube having its discharge end open and constructed with a projection radially from the said open end, a lever forming a gate for the open end of the tube, the said lever terminating at one end in a handle, the other end extending over said projection on the faucet-tube, and a pivot for said lever midway between the outer end of said projection and the open end of the faucet-tube, combined with a clamp upon which said pivot bears, the said clamp extending to the right and left and so as to take a bearing upon the gate portion of the lever on one side of the pivot, and upon the extension of the lever upon the other side of the pivot, substantially as described.

CHARLES F. SMITH.

Witnesses:
J. WILBER STOTT,
J. M. SMITH.